(12) United States Patent
Weber

(10) Patent No.: US 8,882,133 B2
(45) Date of Patent: Nov. 11, 2014

(54) SUPPORT DEVICE FOR A SEMI-TRAILER

(75) Inventor: Elmar Weber, Dulmen (DE)

(73) Assignee: SAF-Holland, GmbH, Bassenbach (DE)

( * ) Notice: Subject to any disclaimer, the term of this patent is extended or adjusted under 35 U.S.C. 154(b) by 0 days.

(21) Appl. No.: 13/993,963

(22) PCT Filed: Aug. 1, 2012

(86) PCT No.: PCT/EP2012/065018
§ 371 (c)(1),
(2), (4) Date: Jul. 29, 2013

(87) PCT Pub. No.: WO2013/026664
PCT Pub. Date: Feb. 28, 2013

(65) Prior Publication Data
US 2014/0159341 A1    Jun. 12, 2014

(30) Foreign Application Priority Data

Aug. 22, 2011   (DE) .......................... 10 2011 081 340

(51) Int. Cl.
*B60D 1/66*    (2006.01)
*B60S 9/08*    (2006.01)
*B60S 9/12*    (2006.01)

(52) U.S. Cl.
CPC ..... *B60S 9/12* (2013.01); *B60S 9/08* (2013.01)
USPC ....................................................... 280/475

(58) Field of Classification Search
CPC ............... B60D 1/66; B60S 9/02; B60S 9/04; B60S 9/06; B60S 9/08
USPC ................... 254/50, 418, 419, 420, 424, 425; 280/475, 763.1, 764.1, 765.1, 766.1
See application file for complete search history.

(56) References Cited

U.S. PATENT DOCUMENTS

| | | |
|---|---|---|
| 2,028,999 A | 1/1936 | Seitz |
| 2,352,117 A | 6/1944 | Pasternack |
| 3,489,395 A * | 1/1970 | Glassmeyer .................. 254/419 |
| 3,592,443 A | 7/1971 | Budrow et al. |
| 3,640,502 A | 2/1972 | Bargman, Jr. |
| 5,984,353 A | 11/1999 | Rasmussen |

FOREIGN PATENT DOCUMENTS

| | | |
|---|---|---|
| CA | 2659433 | 2/2008 |
| DE | 202006012472 | 12/2006 |

OTHER PUBLICATIONS

International Search Report, Nov. 15, 2012, European Patent Office.

* cited by examiner

*Primary Examiner* — Joseph M Rocca
*Assistant Examiner* — Felicia L Brittman
(74) *Attorney, Agent, or Firm* — Price Heneveld LLP

(57) ABSTRACT

A support device for a semi-trailer or the like, that includes an outer support tube having an interior and an inner support tube, wherein the inner support tube is arranged in telescopic fashion in the outer support tube, a spindle mechanism located within the interior of the outer support tube, wherein the inner support tube is moved in the axial direction relative to the outer support tube by the spindle mechanism, and wherein the spindle mechanism comprises a multi-part spindle having a plurality of segments arranged in the axial direction and connected to one another in a flexible manner.

18 Claims, 2 Drawing Sheets

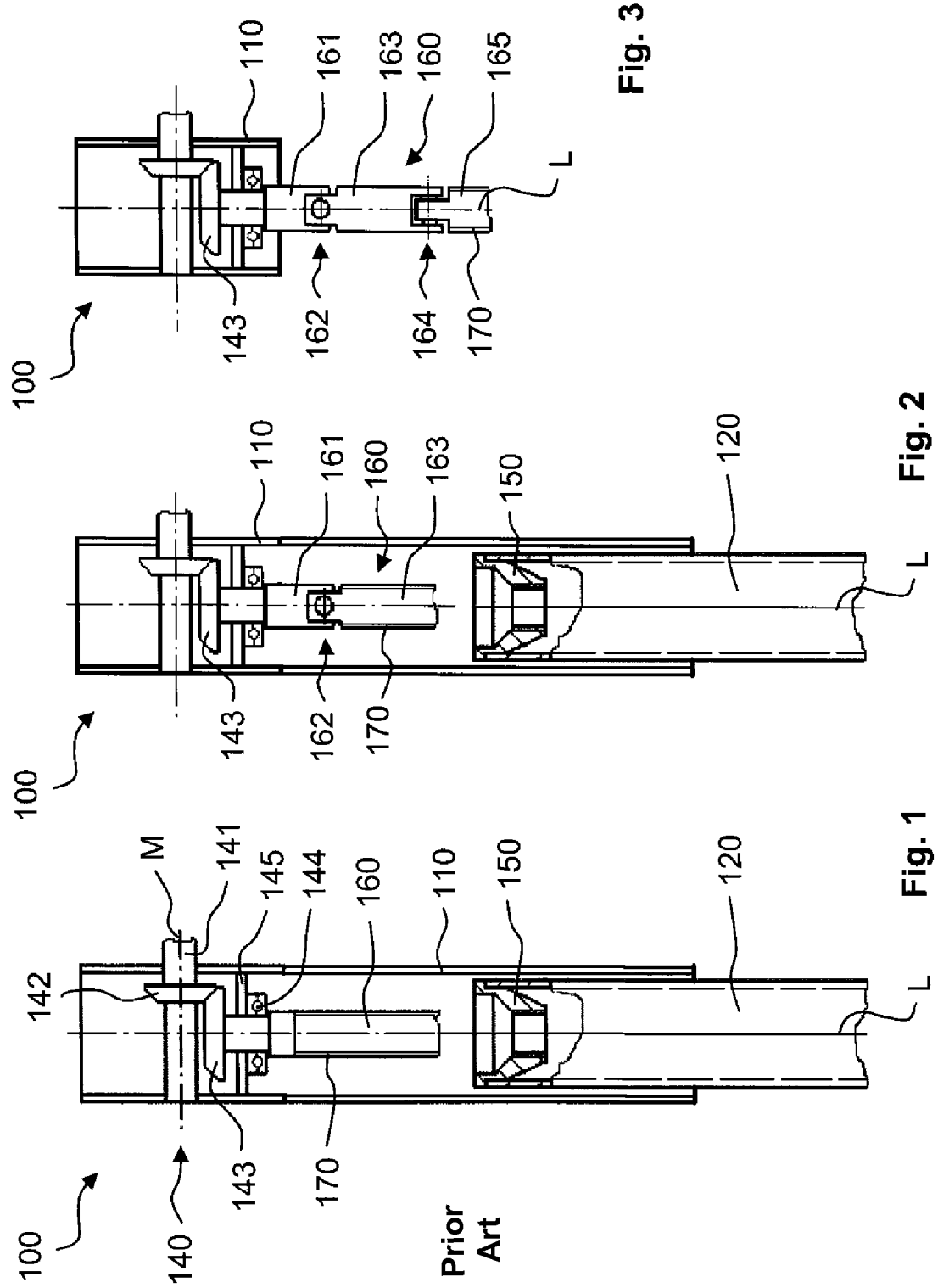

SUPPORT DEVICE FOR A SEMI-TRAILER

BACKGROUND OF THE INVENTION

The invention relates to a support device for a semi-trailer or the like, a semi-trailer comprising at least one support device of said type, and a spindle for use in a support device of said type.

A support device of the type in question serves for supporting a semi-trailer when the latter is decoupled from the truck tractor, wherein for the support in most cases two support devices (pair of supports) are used on one semi-trailer. A support device is known from DE 20 2006 012 472 U1, for example. The known support device comprises an outer support tube and an inner support tube, wherein the inner support tube is arranged in the outer support tube in a telescopic manner and can be moved in the axial direction relative to the outer support tube by means of a spindle mechanism installed inside (i.e. inside of the tube). The spindle mechanism is actuated by means of an actuating mechanism arranged in the outer support tube, by means of which actuating mechanism a rotational movement generated with the help of a hand crank or the like is transmitted to a spindle belonging to the spindle mechanism.

A disadvantage of the known support device is that it is prone to bending or buckling and deflection, which may lead to elastic or plastic deformation and impair the function of the spindle mechanism.

Therefore, an object underlying the present invention is to provide a support device of the type mentioned above, which ensures fail-safe operation.

SUMMARY OF THE INVENTION

The support device according to the invention comprises a straight outer support tube and a straight inner support tube, wherein the inner support tube is arranged in the outer support tube in a telescopic manner and can be moved in the axial direction relative to the outer support tube by means of a spindle mechanism installed inside. There is provided that the spindle mechanism comprises a multi-part spindle which comprises a plurality of segments arranged in the axial direction (one after the other) and connected to one another in a flexible manner. Said segments are in particular cylindrical shaft segments, wherein two adjacent shaft segments are connected to one another in a flexible manner at their axial front ends which face each other.

A flexible connection of two segments means a torque-proof and in particular a rotationally rigid connection of said segments which, however, makes it possible to offset alignment and/or positional errors. By this offset possibility the multi-part spindle of the support device according to the invention is less subject to bending and deflection so that the function of the spindle mechanism and its easy actuation are reliably ensured.

Advantageously, at least two adjacent segments are connected to one another such that they can be pivoted relative to each other. To put it differently, the angle between the longitudinal axes of the at least two adjacent segments may be varied without the necessity of bending the at least two adjacent segments.

Preferably, there is provided that at least two adjacent segments of the multi-part spindle are connected to one another in a flexible manner at their axial front ends which face each other by means of a self-aligning coupling, e.g. a claw coupling, an Oldham coupling, a membrane or ring coupling, a denture coupling or the like.

Particularly preferably, there is provided that at least two adjacent segments of the multi-part spindle are connected to one another in a flexible manner at their axial front ends which face each other by means of a universal joint or Cardan joint. In particular, there is provided that the multi-part spindle of the support device according to the invention is designed as a Cardan shaft which comprises a plurality of segments and a plurality of universal joints connecting said segments to one another.

The axially uppermost segment of the multi-part spindle preferably is connected to an actuating mechanism for actuating the spindle mechanism. The axially bottommost segment of the multi-part spindle preferably is designed with an outer thread, such as in particular a trapezoidal or acme thread. The outer thread may engage a corresponding spindle nut which is attached to the inner support tube either in a fixed or in a floating manner.

At least one of the segments of the multi-part spindle, in particular the axially bottommost segment, may be designed as a hollow segment or tube-like shaft segment. This may concern a single segment or all segments. Thus, advantageously, a reduction in weight may be achieved. Preferably, there is provided that the hollow segments at their axial front ends which face each other are connected to one another in a flexible manner by means of a pin coupling, which may be done by means of pin disc (as will be explained hereinafter in more detail with reference to the Figures), for example.

Particularly preferably, there is further provided that in the hollow space of a hollow segment, which is primarily the axially bottommost segment of the multi-part spindle, there is arranged a pump mechanism for outputting a lubricant. This will be shown in more detail hereinbelow with reference to the Figures.

The axially uppermost segment expediently is connected in a torque-proof manner to a bevel gear or bevel pinion of an actuating mechanism. The actuating mechanism preferably comprises an input shaft for a hand crank and/or a drive motor, on which a bevel gear is arranged in a torque-proof manner, the toothing of which engages the bevel gear, which directly or indirectly is connected in a torque-proof manner to the spindle or the axially upper segment, respectively.

The invention will be described hereinafter in more detail with reference to the Figures by way of example and in a non-limiting manner.

BRIEF DESCRIPTION OF THE DRAWINGS

FIG. 1 shows a schematic sectional view of a support device according to the prior art.

FIG. 2 shows a schematic sectional view of a support device according to the invention with a multi-part spindle in a first embodiment.

FIG. 3 shows a schematic sectional view of a support device according to the invention with a multi-part spindle in a second embodiment.

DETAILED DESCRIPTION OF THE PREFERRED EMBODIMENTS

Figure 5:
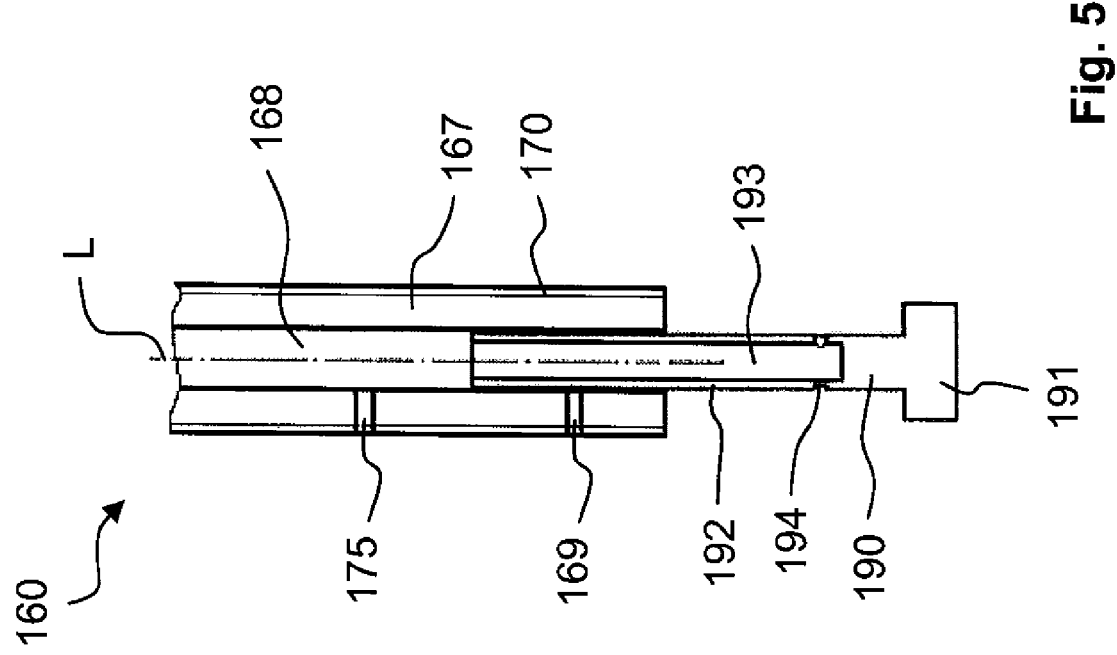
FIG. 5 shows a schematic sectional view of a particular embodiment of a multi-part spindle with an integrated pump mechanism for outputting a lubricant.

In the following Figures, identical components and/or components having the same function are designated by the same reference sign. The features shown in the individual Figures are at the same time general features of the invention and may also be combined in any manner within the framework of the invention.

FIG. 1 shows a support device 100 for a semi-trailer or the like according to the prior art. The support device 100 comprises an outer support tube 110 in which an inner support tube 120 is arranged in a telescopic manner or such that it can be moved or slid in the longitudinal direction, which inner support tube 120 protrudes towards the bottom from the outer support tube 110. The outer support tube 110 and the inner support tube 120 have, for example, a square cross-section. At the bottom end of the inner support tube 120 there is attached a support foot, which is not shown.

In order to be able to move the inner support tube 120 along the longitudinal axis L relative to the outer support tube 110, there is provided a spindle mechanism inside. The spindle mechanism comprises a spindle nut 150 which is attached in a fixed or floating manner at the upper axial end in the inner support tube 120. The spindle mechanism further comprises a spindle 160 which is designed with an outer thread (e.g. a trapezoidal or acme thread) 170. The outer thread 170 of the spindle 160 engages the spindle nut 150 (the engagement is not shown). In a known manner, by turning the spindle 160 (about the longitudinal axis L), the inner support tube 120 may be moved along the longitudinal axis L relative to the outer support tube 110. Depending on the direction of rotation, the inner support tube 120 is hereby retracted into the outer support tube 110 or extended from the outer support tube 110. In order to actuate the spindle mechanism there is provided an actuating mechanism 140 integrated into the outer support tube 110, to which the spindle 160 is connected with its upper axial end.

The actuating mechanism 140 comprises an input shaft 141 for a hand crank and/or a drive motor. The longitudinal axis or axis of rotation M of the input shaft 141 extends perpendicular to the longitudinal axis or axis of rotation L of the spindle 160. On the input shaft 141 there is arranged in a torque-proof manner a first bevel gear 142, the toothing of which engages a second bevel gear 143, wherein the second bevel gear 143 is connected in a torque-proof manner directly or indirectly to the spindle 160. The first (driving) bevel gear 142 and the second (driven) bevel gear 143 form a bevel gearing which transforms a rotational movement on the input shaft 141 into a rotational movement of the spindle 160 or in a spindle rotational movement. In order to axially and/or radially support the upper axial end of the spindle 160 there is provided a rolling contact bearing 144. 145 designates a carrier or support plate. The actuating mechanism 140 may comprise an integrated manual multi-speed transmission (such as it is described in DE 20 2006 012 472 U1, for example).

FIG. 2 shows a multi-part spindle 160 in a first embodiment, which is installed in a support device 100 according to the invention. The multi-part spindle 160 comprises two segments 161 and 163 which are arranged one after the other in the axial direction L. The axially upper segment 161 is connected to the bevel gear 143 of the actuating mechanism 140 in a torque-proof manner. The axially lower segment 163 comprises an outer thread 170 which engages the spindle nut (cf. reference numeral 150 in FIG. 1) on the inner support tube 120. The segments 161 and 163 are connected to one another in a flexible manner at their axial front ends which face each other by means of a universal joint 162. The universal joint 162, on the one hand, provides for a torque-proof connection between the segments 161 and 163 and, on the other hand, allows for little angular offset of the segments 161 and 163 relative to each other, so that it is possible to balance or offset positional errors. Thus, the multi-part spindle 160 may carry out a rotational movement about the longitudinal axis L in the usual manner, however, compared with a single-part spindle, it is subjected considerably less to bending or deflection, as has been explained above. The arrangement of three or more segments 161, 163, 165 makes it possible to particularly optimally balance or offset not only positional or angular errors but also alignment or displacement errors with regard to the longitudinal axis L.

FIG. 3 shows a multi-part spindle 160 in a second embodiment, which is installed in a support device 100 according to the invention. The outer support tube 110 is shown only partially and the inner support tube is not shown (in this respect reference is made to FIGS. 1 and 2). The multi-part spindle 160 is designed as a Cardan shaft and comprises three segments 161, 163 and 165 which are arranged one after the other in the axial direction L and which are connected to one another by means of two universal joints 162 and 164. The bolts of the universal joints 162 and 164—and thus the swivel axes thereof—are displaced relative to each other by 90°. The axially bottommost segment 165 is designed with an outer thread 170 which engages the spindle nut on the inner support tube. As to the rest, the above explanations apply analogously.

Figure 4:
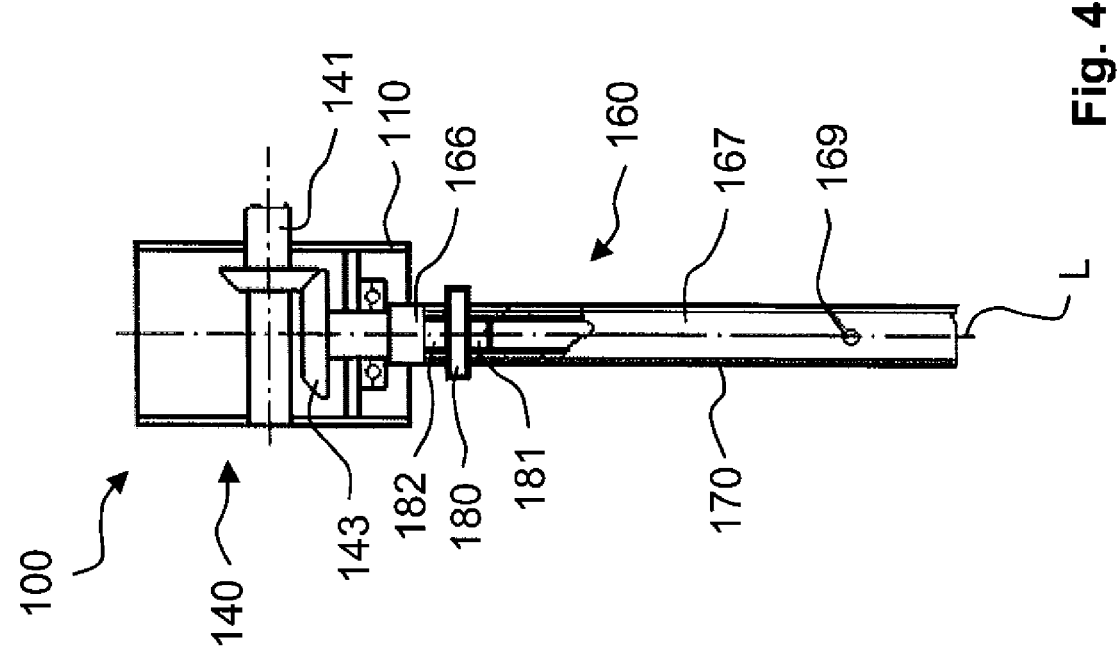
FIG. 4 shows a schematic sectional view of a support device according to the invention with a multi-part spindle in a third embodiment.

FIG. 4 shows a multi-part spindle 160 in a third embodiment, which is installed in a support device 100 according to the invention. The outer support tube 110 is shown only partially and the inner support tube is not shown (in this respect reference is made to FIGS. 1 and 2). The multi-part spindle 160 comprises two segments 166 and 167 which are arranged one behind the other in the axial direction L and which are designed as hollow segments. The segments 166 and 167 are connected to one another in a flexible manner at their axial front ends which face each other by a pin coupling which is designed as a pin disc 180. The pin disc 180 comprises two pins or journals 181 and 182 which axially face each other and which in a form-fitting manner engage the hollow spaces of the segments 166 and 167. Locking may be done e.g. by means of connecting elements (e.g. a safety or locking pin). To a certain extent also a shrink fit, a swaging and/or a welding or welded joint is inconceivable. As to the rest, the above explanations apply analogously.

FIG. 5 shows a particular embodiment of a hollow segment, wherein by way of example there is shown the lower axial segment 167 of the spindle 160 shown in FIG. 4. In the hollow space 168 of the segment 167 there is arranged a simple pump mechanism for outputting a lubricant. The pump mechanism comprises an oil tube or lubricating tube 190. The oil tube 190 comprises a piston section 192 which is supported in the hollow space 168 of the segment 167 such that it is axially and relatively movable. With its bottom end section 191 the oil tube 190 is permanently attached to the inner support tube (cf. reference sign 120 in FIG. 1 or FIG. 2) or also to the support foot.

When the inner support tube is extended or retracted, there is a relative movement between the piston section 192 and the segment 167 of the spindle 160, which results in a pump effect. When the piston section 192 is retracted, at first the vent bore or vent hole 175 in the wall of the segment 167 is closed. The air trapped in the hollow space 168 is compressed when the piston section 192 is further axially retracted, so that an internal pressure builds up. When the lubricating opening 194 in the bottom wall region of the piston section 192 overlaps with the lubricating hole or lubrication bore 169 in the wall of the segment 167, due to the internal pressure present, a lubricant present in the lubricant reservoir 193 is pressed towards the outside in a controlled and portioned manner and, as a result, is distributed on the surrounding outer thread 170.

The lubricant, which in particular is a grease, thus easily comes to those areas which have to be lubricated in particular. Thus, it is possible to lubricate purposefully using little lubricant of however, high-quality. The pump mechanism may also have a different design or structure.

These and other features, advantages, and objects of the present invention will be further understood and appreciated by those skilled in the art by reference to the following specification, claims, and appended drawings.

The invention claimed is:

1. A support device for a semi-trailer, comprising
an outer support tube having an interior,
an inner support tube,
wherein the inner support tube is arranged in telescopic fashion in the outer support tube;
a spindle mechanism located within the interior of the outer support tube, wherein the inner support tube is moved in the axial direction relative to the outer support tube by the spindle mechanism; and
wherein the spindle mechanism comprises a multi-part spindle having a plurality of segments arranged in the axial direction and connected to one another in a flexible manner.

2. The support device of claim 1, wherein at least two adjacent segments are connected to one another such that the at least two adjacent segments can be pivoted relative to each other.

3. The support device of claim 1, wherein at least two adjacent segments each include an axial front end that face each other, and wherein at least two adjacent segments are connected to one another in a flexible manner by a self-aligning coupling.

4. The support device of claim 3, wherein the self-aligning coupling comprises a universal joint.

5. The support device of claim 4, wherein the multi-part spindle comprises a Cardan shaft including the plurality of segments and a plurality of universal joints connecting the segments of the Cardan shaft to one another.

6. The support device of claim 5, wherein an axially bottommost segment of the multi-part spindle includes an outer thread.

7. The support device of claim 6, wherein at least one of the segments of the multi-part spindle includes a hollow segment.

8. The support device of claim 7, wherein the at least one hollow segment includes at least two hollow segments, and wherein the at least two hollow segments each include an axial front end connected to one another in a flexible manner by a pin coupling.

9. The support device of claim 8, wherein in a hollow space of a hollow segment there is arranged a pump mechanism for outputting a lubricant.

10. The support device of claim 9, further comprising:
an actuating mechanism with a bevel gearing which transforms a rotational movement on an input shaft of the actuating mechanism into a rotational movement of the spindle.

11. The support device of claim 10, wherein an axial upper segment of the spindle is connected to at least one of a bevel gear and a bevel pinion of the actuating mechanism in a torque-proof manner.

12. The support device of claim 1, wherein an axially bottommost segment of the multi-part spindle includes an outer thread.

13. The support device of claim 1, wherein the multi-part spindle comprises a plurality of segments, and wherein at least one of the segments of the multi-part spindle includes a hollow segment.

14. The support device of claim 13, wherein the at least one hollow segment includes at least two hollow segments, and wherein at least two hollow segments each include an axial front end connected to one another in a flexible manner by a pin coupling.

15. The support device of claim 14, wherein in a hollow space of a hollow segment there is arranged a pump mechanism for outputting a lubricant.

16. The support device of claim 1 further comprising:
an actuating mechanism with a bevel gearing which transforms a rotational movement on an input shaft of the actuating mechanism into a rotational movement of the spindle.

17. The support device of claim 16, wherein an axial upper segment of the spindle is connected to at least one of a bevel gear and a bevel pinion of the actuating mechanism in a torque-proof manner.

18. A semi-trailer, comprising:
at least one support device comprising:
an outer support tube having an interior and an inner support tube,
wherein the inner support tube is arranged in telescopic fashion in the outer support tube,
a spindle mechanism located within the interior of the outer support tube, wherein the inner support tube is moved in the axial direction relative to the outer support tube by the spindle mechanism, and wherein the spindle mechanism comprises a multi-part spindle having a plurality of segments arranged in the axial direction and connected to one another in a flexible manner.

\* \* \* \* \*